Figures 1, 2:
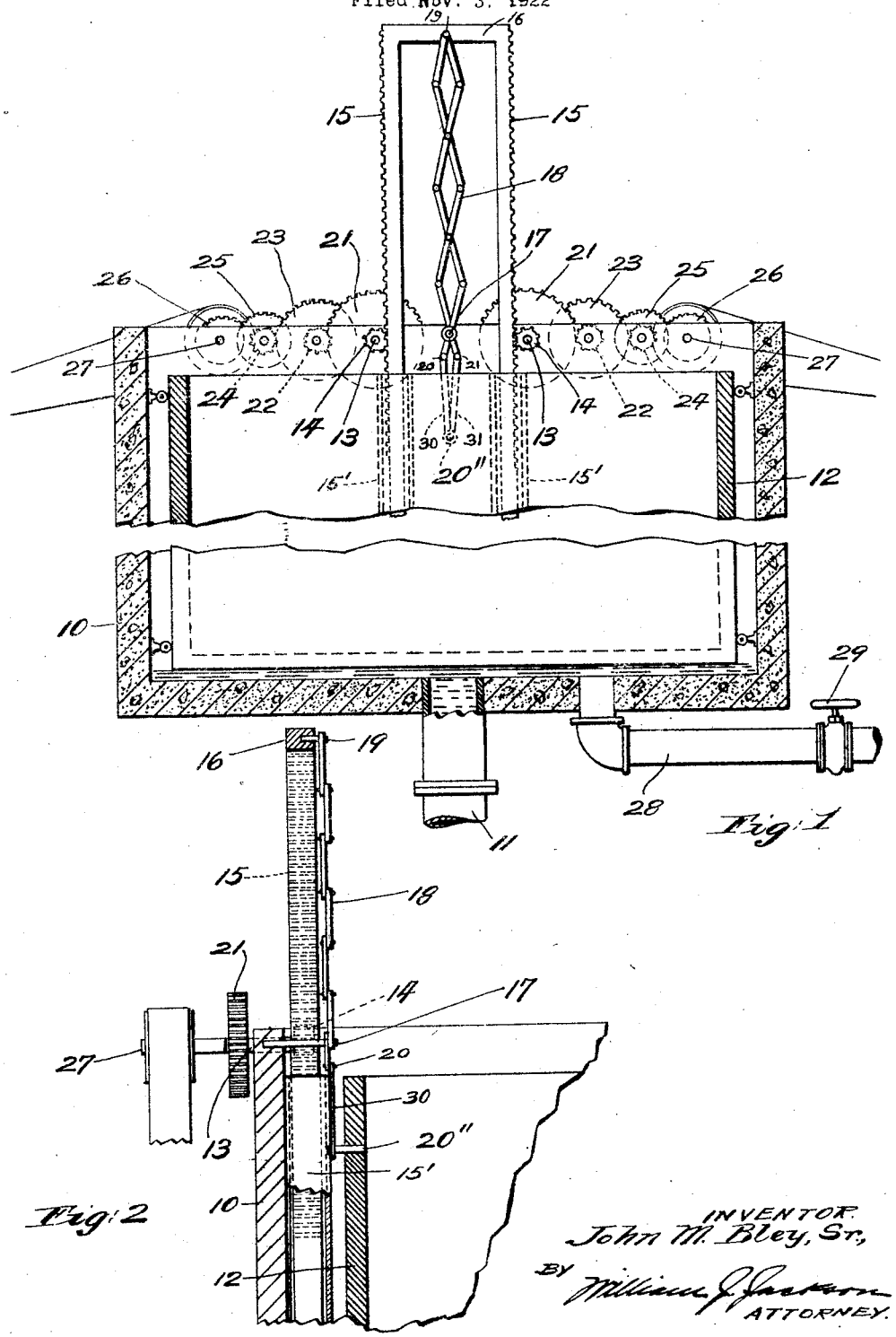

July 13, 1926.

J. M. BLEY, SR 1,592,552

TIDAL AND SIMILAR WATER MOTOR

Filed Nov. 3, 1922

INVENTOR.
John M. Bley, Sr,
BY William J. Jackson
ATTORNEY.

Patented July 13, 1926.

1,592,552

UNITED STATES PATENT OFFICE.

JOHN M. BLEY, SR., OF PHILADELPHIA, PENNSYLVANIA.

TIDAL AND SIMILAR WATER MOTOR.

Application filed November 3, 1922. Serial No. 598,858.

This invention relates to that class of apparatus designed for utilizing the power developed by the ebb and flow of the tides of rivers and other bodies of water. The principal object of the present invention is to provide a motor of this general character which is of simple and relatively inexpensive construction, capable of being positively operated in a vertical direction by the rising of water, as tide, to actuate a float and which upon said water receding causes the float to descend whereby the upward and descending vertical movements actuate suitable mechanism for supplying or storing power. Between the period of high tide and initial ebb there is an interval or space of time. It is a further object of the present invention to provide auxiliary means whereby the motor may be operated during this interval or space of time. A still further object of the present invention is to provide between the main housing or basin and the float, as contained therein, a lazy-tong or similar leverage arrangement whereby during the descending of the float an increased or accelerated movement is imparted to the gear transmission of the motor. Other and further objects of the present invention reside in the provision of the general arrangement, construction and connection of parts for attaining the results sought by the foregoing objects.

The invention consists of the improvements hereinafter described and finally claimed.

The nature, characteristic features and scope of the invention will be more fully understood from the following description taken in connection with the accompanying drawings forming part hereof, and in which:

Fig. 1, is a fragmentary view, partly in section, illustrating a motor embodying features of the invention, and Fig. 2, is a similar view illustrating in detail the lazy-tong arrangment shown in Fig. 1.

For the purpose of illustrating my invention I have shown in the accompanying drawings one form thereof which is at present preferred by me, although it is to be understood that the various instrumentalities of which my invention consists can be variously arranged and organized and that my invention is not limited to the precise arrangement and organization of the instrumentalities as herein shown and described.

In the drawings, 10 designates a compartment or basin preferably constructed of concrete. It may have an open top as shown or have a closed top. The basin 10 is in communication with a suitable body of water, as a river. It may be in communication with any other body of water having a rising and falling movement. The means of communication between basin 10 and a body of water may be a pipe which is designated 11. Instead of being connected to a river or the like, water under pressure as from a reservoir or the like may be passed through pipe 11 for a predetermined period of time, for instance six hours. Water entering through pipe 11, either through rising of the tide or water from an artificial source, causes float 12 contained within basin 10 to move in an upward direction. This float is very heavy being preferably made of steel or other metal. Journalled in a side wall of basin 10 are a pair of horizontal shafts 13 which shafts extend entirely through said side wall and project upon opposite sides thereof. Fixed to each shaft 13 and within basin 10 is a pinion 14. These pinions 14 co-act with racks 15 as shown in Fig. 1. These racks 15 are vertically disposed and extend down into basin 10 and are connected at their tops by a cross piece 16 so that the structure is substantially of the configuration of an inverted U. The lower ends of the racks may work through conduits 15'. Having fulcrumed relation, as at 17, with the basin 10 is a lazy-tong arrangement 18, the upper end of which is pivoted as at 19 to cross piece 16. The lower ends of the lazy-tongs have pivotal relation as at 20—20' with the free ends of pivotal arms 30—31. These arms are pivoted as at 20'' to float 12. As shown in Fig. 1, the float 12, due to fall of water within basin 10, has reached its lowest level. During the fall of the float the lazy-tongs have expanded thereby raising the racks 15 to a height considerable in excess of the distance the float has dropped. It will be understood that with water flowing into receptacle 10 and the consequent raising of float 12 that the lazy-tongs will fold thus causing the racks 15 to descend. It is thus apparent that during the period of time water is rising, say six feet, the racks 15 are being moved downward due to the folding of the lazy-tongs and during the ebb of tide for, say six feet, the racks 15 are being raised many times this distance due to the expansion of the lazy-tongs. Other forms of leverage may be employed if desired. Thus positive movement in two directions of rotation is transmitted to shafts 13. Each shaft 13 is provided with a gear-wheel 21 which in turn meshes with a pinion 22 fixed upon the same shaft with which is a gear-wheel 23. The gear-wheel 23 in turn meshes with another pinion 24 having mounted upon the same shaft therewith a gear-wheel 25. The gear-wheel 25 meshes with still another gear-wheel 26 fixed upon a shaft 27. From this shaft 27 power is transmitted to suitable machinery, not shown, and which forms no part of the present invention. The number of gear-wheels however may be increased or diminished as occasion requires.

In case the motor is used in connection with a body of water having ebb and flow, it is desirable to cause the motor to actuate during that period of time between the end of the ebb of the tide and the beginning of the flow of the tide. For the purpose I may introduce water under pressure to the basin through pipe 28 as shown in Fig. 1. During a stated interval, valve 29 may be opened and water under pressure introduced to basin 10 to cause the motor to continue to operate. By closing valve 29 with the return of the ebb or flow of tide the motor will again function as previously described.

It will now be apparent that I have devised a novel and useful construction which embodies the features of advantage enumerated as desirable in the statement of the invention and the above description and while I have in the present instance shown and described the preferred embodiment thereof, it is to be understood that the same is susceptible of modification in various particulars without departing from the spirit or scope of the invention or sacrificing any of its advantages. It will be understood that additional rack bars may be employed if desired, for instance, one or more upon each side of the basin.

What I claim is:

In combination a basin of concrete at least one vertical wall of which is provided with a pair of fixed, spaced guides, means for supplying water to said basin to raise a float and means to empty the basin to lower the float whereby positive continuous operations in two directions are obtained for imparting power, a hollow float of metal within said basin, a pair of arms pivoted to a side wall of the float opposite said guides, an inverted U-shaped rack bar the legs of which are capable of vertical movement through said guides, a shaft journalled upon opposite sides of said rack bar in the basin side wall, a pinion upon each shaft for meshing with the teeth upon the legs of said bar, a gear wheel upon each of said shafts, a train of gear wheels upon each side of the rack bar with which the first mentioned gear wheels mesh, a lazy-tong arranged between the rack bar legs and fulcrumed to the wall of the basin provided with said guides, one end of the lazy-tong being pivoted centrally of the top cross bar connecting the legs of the rack bar and the opposite end being pivoted to the said arms as attached to said float, said lazy-tong affording increased acceleration to said train of gear wheels and whereby positive motive power is obtained in both upward and downward operation of the device, and auxiliary means for supplying additional water to said basin for a predetermined period of time.

In testimony whereof, I have hereunto signed my name.

JOHN M. BLEY, Sr.